(12) United States Patent
Hyppänen

(10) Patent No.: US 6,802,890 B2
(45) Date of Patent: Oct. 12, 2004

(54) METHOD AND APPARATUS FOR SEPARATING PARTICLES FROM HOT GASES

(75) Inventor: Timo Hyppänen, Karhula (FI)

(73) Assignee: Foster Wheeler Energia Oy, Helsinki (FI)

(*) Notice: Subject to any disclaimer, the term of this patent is extended or adjusted under 35 U.S.C. 154(b) by 36 days.

(21) Appl. No.: 10/240,773
(22) PCT Filed: Apr. 6, 2001
(86) PCT No.: PCT/FI01/00337
§ 371 (c)(1), (2), (4) Date: Feb. 6, 2003
(87) PCT Pub. No.: WO01/76722
PCT Pub. Date: Oct. 18, 2001

(65) Prior Publication Data
US 2003/0150325 A1 Aug. 14, 2003

(30) Foreign Application Priority Data
Apr. 7, 2000 (FI) .......................... 20000832

(51) Int. Cl.$^7$ .............................. B01D 45/16
(52) U.S. Cl. .................. 95/271; 55/346; 55/349; 55/434.1; 55/434.4; 55/459.1; 422/146; 422/147
(58) Field of Search ............. 55/434.1–434.4, 55/459.1, 435, 345, 346, 348, 349; 95/269, 271; 422/146, 147

(56) References Cited

U.S. PATENT DOCUMENTS

| 2,530,077 A | * | 11/1950 | Ramsing ..................... 266/172 |
| 4,288,235 A | * | 9/1981 | Gartside et al. ........... 55/434.1 |
| 4,615,715 A |   | 10/1986 | Seshamani ................. 55/434.4 |
| 4,880,450 A |   | 11/1989 | Magol et al. .............. 55/434.1 |
| 4,904,286 A | * | 2/1990 | Magol et al. .............. 55/434.4 |
| 4,961,761 A | * | 10/1990 | Johnson ..................... 55/434.4 |

(List continued on next page.)

FOREIGN PATENT DOCUMENTS

| DE | 3435214 A1 | 4/1986 |
| EP | 0 205 718 A1 | 6/1985 |
| WO | WO 96/28237 | 9/1996 |

*Primary Examiner*—Richard L. Chiesa
(74) *Attorney, Agent, or Firm*—Fitzpatrick, Cella, Harper & Scinto

(57) ABSTRACT

A centrifugal separator assembly, which is attached to a fluidized bed reactor for separating solid particles from gas exhausted from a reaction chamber of the fluidized bed reactor, includes a vortex chamber. The vortex chamber is in a horizontal direction defined by vertically-extending outer walls formed of planar water tube panels, the inside of the outer walls being at least partly provided with a refractory lining and defining a gas space in the vortex chamber, where at least one vertical gas vortex is established. The separator assembly also includes at least one inlet for introducing gas into the gas space from the reaction chamber, at least one outlet for discharging purified gas from the gas space, and at least one outlet for discharging separated solid particles from the gas space. In the separator assembly, the vertically-extending outer walls of the vortex chamber form at least one corner, with the angle between the sides of the corner exceeding ninety degrees, and the corner being rounded by a refractory lining on the inside of the outer walls. A method of separating solid particles from exhausted gas with a high degree of particle separation is also provided. In the method, which includes providing a separator assembly as described above, exhausted gas in the vortex chamber is brought to hit at least one corner rounded by the refractory lining on the inside of the outer walls, and the angle between the vertically-extending outer walls of the corner exceeds ninety degrees.

15 Claims, 4 Drawing Sheets

U.S. PATENT DOCUMENTS

| | | | | |
|---|---|---|---|---|
| 5,116,394 A | * | 5/1992 | Garkawe | 55/434.4 |
| 5,281,398 A | | 1/1994 | Hyppanen et al. | 422/147 |
| 5,417,932 A | * | 5/1995 | Castagnos et al. | 422/147 |
| 5,738,712 A | | 4/1998 | Hyppanen | 95/271 |
| 5,788,848 A | * | 8/1998 | Blanche et al. | 210/162 |
| 5,868,809 A | * | 2/1999 | Heard | 55/337 |
| 5,904,755 A | * | 5/1999 | Kanazashi et al. | 96/55 |
| 6,294,001 B1 | * | 9/2001 | Hyppanen et al. | 95/271 |

\* cited by examiner

METHOD AND APPARATUS FOR SEPARATING PARTICLES FROM HOT GASES

BACKGROUND OF THE INVENTION

The present invention relates to a method and an apparatus for separating particles from hot gases.

Thus, the invention relates to a centrifugal separator assembly and a method of separating particles in a centrifugal separator assembly attached to a fluidized bed reactor, for separating solid particles from gas exhausted from the reaction chamber of the fluidized bed reactor, which separator assembly comprises a vortex chamber, which is in a horizontal direction, defined by vertically-extending outer walls formed of planar water tube panels, the inside of the walls being provided with a refractory lining and defining a gas space in the vortex chamber, in which at least one vertical gas vortex is established, at least one inlet for introducing gas into the gas space from the reaction chamber, at least one outlet for discharging purified gas from the gas space, and at least one outlet for discharging separated solid particles from the gas space.

The present invention relates especially to centrifugal separators utilized for separating solid particles from the process and product gases of fluidized bed reactors, especially, circulating fluidized bed reactors used for combustion or gasification of carbonaceous or other fuels.

It is generally known how the inlet and outlet ducts of a centrifugal separator should be arranged so as to make the flue gas entering through the inlet duct produce a vertical gas vortex. Conventional centrifugal separator assemblies include one or more centrifugal separators, i.e., cyclones, defined by an outer wall having a shape of a right circular cylinder, and a conical bottom. The cyclones of a fluidized bed reactor are traditionally manufactured as uncooled structures provided with a refractory lining, though the walls of the fluidized bed reactor itself are generally formed of cooled water tube panels. When connecting an uncooled particle separator to a cooled reaction chamber, it is necessary to consider varying thermal motion and use such arrangements that enable relative motion, even if the arrangements are expensive and susceptible to damage. Cylindrical cyclones have also been manufactured as structures formed of wafer tubes, whereby the temperature difference between the cyclone and the cooled reactor chamber remains small. However, to provide a water tube wall construction of a cylindrical form and to connect it to the surrounding constructions requires a lot of manual labor and is, therefore, expensive.

U.S. Pat. No. 4,880,450, for example, discloses a method by which a cooled cylindrical cyclone can be connected to the furnace of a fluidized bed boiler and to the heat recovery section thereof. The cylindrical upper section of the cyclone comprises water or steam tubes attached to each other, the inner surface of which is covered with insulative material. The separator according to this patent can be connected to a cooled environment without separate elements enabling relative motion, but the construction requires a lot of effort and is, therefore, expensive.

U.S. Pat. No. 5,281,398 discloses an arrangement in which particles are separated from hot gases in a centrifugal separator, the vortex chamber of which is composed of planar water tube panels. Thus, the gas space of the vortex chamber is polygonal in horizontal cross section, preferably quadrate or rectangular. This kind of separator is inexpensive to manufacture and can easily be connected to a reactor furnace formed of similar wall panels, whereby a compact unit is established. Traditionally, the gas volume of a separator vortex chamber is cylindrical, as the cylindrical space interferes with maintenance of the gas vortex velocity to as small a degree as possible. The invention disclosed in U.S. Pat. No. 5,281,398 is, however, based on the fact that a gas vortex can also be established in a space polygonal in cross section. In a cylindrical separator, the particles separated by centrifugal forces are driven to the vortex circumference and flow downwardly along the inner walls of the vortex chamber. Appropriate operation of a polygonal separator is based on the fact that the corners of the gas space enhance the separation of the particles and serve as suitable flow-down areas for the separated particles.

U.S. Pat. No. 4,615,715 discloses an assembly in which a cylindrical cyclone manufactured of abrasion-resistant material is disposed inside a cooled enclosure which is quadrate in cross section. In this arrangement, the shape of the gas space is ideal for maintaining the vortex velocity. Nevertheless, the manufacture of the water tube panels for the separator enclosure can be automated, and the separator can straightforwardly be connected to a cooled environment. In the arrangement according to this patent, the relatively large space between the annular inner space and the quadrate outer enclosure is filled with suitable material. The problem with this material is that it serves as a heat insulator and increases the weight and heat capacity of the separator. Thus, it increases the temperature of the separator's inner wall during operation and adds to its thermal inertia. Large and rapid changes of temperature can cause damage to the material in the intermediate space, which adds to the maintenance and repair costs. Therefore, the changes of temperature in the separator need to be sufficiently slow, which fact is to be considered when changing the capacity of a plant and especially during start-ups and shut-downs. Further, the innermost surface of the material has to be very abrasion-resistant and, therefore, the filling of the intermediate space is done by a special multi-layer technique. This however, adds to the construction costs and makes the separator structure complicated.

SUMMARY OF THE INVENTION

It is an object of the present invention to provide an improved centrifugal separator assembly and a method of separating particles from hot gases.

In particular, it is an object of the present invention to provide a compact centrifugal separator assembly and a method of separating particles, which assembly is less expensive to manufacture and the degree of particle separation of which method is high.

Moreover, it is an object of the present invention to provide a method of separating particles and a centrifugal separator apparatus with minor need for maintenance, which apparatus can, preferably, be connected to a cooled reaction chamber.

In order to achieve these and other objects, a centrifugal separator assembly, as set forth in the claims, is provided.

Thus, it is characteristic of the centrifugal separator assembly according to the present invention that the vertically-extending outer walls of the vortex chamber form at least one corner, the angle between the sides of which exceeds ninety degrees, the corner being rounded by a refractory lining on the inside of the outer walls.

In order to achieve the objects, a method of separating particles, as set forth in the claims, is also provided.

Thus, in one aspect according to the present invention, the gas exhausted from the reaction chamber of a fluidized bed reactor is, in the vortex chamber, brought to hit at least one corner rounded by a refractory lining on the inside of the outer walls, the angle between the vertically-extending outer walls of which corner exceeds ninety degrees.

The arrangement according to the present invention combines the advantages of planar cooling surfaces and a rounded gas space and avoids the disadvantages of thick refractory layers by providing the outer wall of the vortex chamber with a polygonal horizontal cross section, in which at least some of the angles are more than ninety degrees.

Separators according to U.S. Pat. No. 5,281,398, in which the gas space of the vortex chamber is a polygon in horizontal cross section, operate flawlessly in normal operating conditions. It has been discovered, however, that a particularly advantageous construction can be provided for new generation gas separators by using gas velocities and separator design standards that differ from those used earlier. As such development of separators is further encouraged, the angles of the gas space may, in some applications, cause restrictions for the total design of the reactor.

It has been discovered that in some applications, the operation of a polygonal separator can be further improved by rounding off one or more corners formed by the outer walls of the vortex chamber. Further, so as to minimize structural problems and problems related to the durability of the construction caused by rounding of the corners, it is essential in the present arrangement that the angle between the planar panels of the outer wall of the vortex chamber is, at the rounded outer corner, distinctly over ninety degrees.

It has previously been known on the basis of U.S. Pat. No. 5,738,712 that the gas flow entering a rectangular vortex chamber and the gas vortex in the vortex chamber can disrupt each other unless the gas vortex is redirected in the direction of the incoming jet in the corner formed by a partition wall connected to the inlet opening. The present invention is, however, related to another problem, i.e., a problem of the gas vortex possibly remaining less optimal in the corner area of the vortex chamber.

When a vertical circular cylinder is surrounded by four vertically-extending planar panels perpendicular to each other and in a tangential relationship to the cylinder, the distance between the planar panels and the cylinder surface at the corners is about 0.414 times the cylinder radius. Consequently, if refractory lining is provided so that the thickness of the layer in the middle of the planar panels is, e.g., 0.05 times the cylinder radius, the layer would be more than eight times thicker at the corners. Thus, especially in the corner areas, the thermal conductivity of the refractory layer may be low, and the cooling of the outer surface is not necessarily able to keep the temperature of the inner surface low enough. Moreover, the varying thickness of the refractory lining can cause considerable temperature differences and thereby increase the risk of the layer getting damaged. A thick layer also adds to the weight of the structure and thereby causes problems related to supporting the structure.

If the cylinder is surrounded by five panels, instead of four, the angle between the panels is 108 degrees and the distance between the panels and the cylinder surface is only 0.236 times the cylinder radius at the corners. With six, seven, and eight panels, the angles therebetween being 120, 128.6, and 135 degrees, respectively, the distance is 0.154, 0.110, and 0.082 times the cylinder radius, respectively. Thus, the maximum thickness of the refractory layer as well as its weight and heat capacity decrease substantially, even when the angle of the separator corner is, e.g., 108 degrees instead of 90 degrees. If the angle is 135 degrees, the maximum layer thickness required by the rounding is only a fifth of what is required by the rounding of a right angle. The thermal conductivity of a thin refractory lining is high and relatively even in the various parts of the outer wall of the vortex chamber, whereby the maximum temperatures of the layer under operation decrease and the temperature differences in the various wall parts are diminished.

According to a preferred embodiment of the present invention, each separator corner is rounded and approximately of the same size. In this case, the number of corners is preferably five, six, seven, or eight and the angles are preferably about 108, 120, 128.6, or 135 degrees, respectively. When the number of separator corners is six or eight, a plurality of separators can preferably be connected to each other and/or to the furnace. Most preferably, the separator has eight corners, whereby the parallel walls between the separator and the reaction chamber as well as between adjacent separators can be utilized when designing the structure. However, in some special cases, i.e., for arranging a particular support structure and a gas inlet duct, it can be advantageous also to manufacture separators in which the number of corners is odd.

According to another preferred embodiment, only some particle separator corners are rounded. In this case, the sizes of the rounded corners can be different from the ones mentioned above. Preferably, though, the angles are between about 110 to about 150 degrees, and more preferably about 135 degrees. Most preferably, a separator including angles of various sizes can have a basic shape of a polygon, some angles being right angles and not rounded and the other angles being beveled by a planar panel and rounded by a refractory lining.

According to one preferable arrangement, a particle-laden gas flow entering through an inlet opening hits first, nearly perpendicularly, a wall or the other side of a right-angled corner, but after the first impact, the gas flow hits at least one rounded corner. In this kind of arrangement, the first corner or wall in the vortex chamber serves as a suitable spot for separating particles, but in the rounded corners after that, the aim is to maintain the velocity of the gas flow at as high a level as possible.

The rounding of the corners can preferably be arranged so that in the section of the vortex chamber outer wall that includes a plurality of corners, the vortex chamber inner wall is continuously cylindrical. In other words, the radius of curvature of the rounding is approximately the same as the distance between the center of the vortex established in the vortex chamber and the inner wall of the vortex chamber. Another preferable way is to provide separate rounding in each corner area, whereby the radius of curvature of the rounding is smaller than mentioned above, and a straight inner wall surface remains between the rounded parts requiring only a thin, even refractory lining to protect the wall. The thickness required by the even refractory lining depends on the materials used and the operational conditions, being typically at least about 15 to about 70 mm. In order to achieve the benefits gained by the rounding according to the present invention, the radius of curvature should not be too small. Preferably, the radius of curvature of the rounding is at least about one third of the radius of the vortex established in the vortex chamber, i.e., of the distance between the vortex center and the inner wall of the vortex chamber.

When using a short radius, curvature of the roundness of the chamber is not complete, but the amount of the refractory lining on the walls is even smaller than in the case of a continuously cylindrical vortex chamber. In some cases, due to the varying characteristics of the corners, it can be preferable to use various radii of curvature for the rounding in different corners. A special case according to this principle is the one in which one or more corners formed by the outer walls are rounded and one or more corners are not rounded.

The horizontal cross section of the vortex chamber can preferably be either nearly circular, whereby only one gas vortex is established in the vortex chamber, or oblong and shaped in a manner allowing more than one gas vortex to be established in the vortex chamber, i.e., the dimension of the vortex chamber extending in the direction that the reaction chamber wall closest to the vortex chamber extends is preferably about twice the depth perpendicular to the width, whereby two adjacent gas vortices can preferably be established in the vortex chamber.

The gas inlet ducts to a vortex chamber of two gas vortices are located most preferably in the middle of the vortex chamber wall on the reaction chamber side, but they can also be disposed separately from each other, in the proximity of the outer corners of the vortex chamber wall on the reaction chamber side. The wall facing the inlet ducts arranged in the middle of the wall in the vortex chamber of two vortices on the reaction chamber side can be straight, whereby the gas flow entering the vortex chamber side can be straight, whereby the gas flow entering the vortex chamber hits the wall almost perpendicularly. Alternatively, a wall section formed of planar water tube panels and that is triangular in cross section can be provided in the middle of the wall, by rounding of which wall section the gas flow is brought to hit a rounded wall first.

To ensure structural strength and high separation capacity, two or more smaller separators, instead of one large separator, are often constructed in a large reaction chamber. When using several cooled cylindrical separators, the large proportion of manual work adds to the cost excessively. Thus, for economical reasons, it is sometimes necessary to use larger separators than are, in fact, optimal. In these cases, it is not always certain that a high separation capacity can be accomplished in all conditions, and therefore, to ensure the structural strength, space consuming and cost increasing arrangements have to be used. When using the structure according to the present invention, even small separators can be manufactured at low cost, whereby such separators, being easy to support and optimal as regards the separation capacity, can be used.

When the outer walls of the vortex chambers manufactured according to the present invention include, e.g., eight angles, two adjacent vortex chambers can preferably be arranged so that their sides run parallel, whereby the parallel wall panels of the vortex chambers can straightforwardly be connected to each other. The adjacent vortex chambers can also advantageously be interconnected in such a manner that they share a common straight wall section.

Centrifugal separator assemblies according to the present invention can preferably be arranged in conjunction with a reaction chamber so that some of the planar outer wall panels of the vortex chamber are parallel to the planar wall of the reaction chamber, whereby the vortex chamber can easily be attached to the reaction chamber wall. The vortex chambers can also advantageously be manufactured so that the wall sections of the vortex chambers on the reaction chamber side are shared by the reaction chamber.

The possibility of using common wall sections between two separators or between the separator and the reaction chamber is one of the advantages of a separator formed of planar tube panel walls, as it makes it possible to reduce the manufacturing costs considerably. The common wall sections cannot, however, be easily supported from either side of the wall section, whereby the width of this kind of common wall has, in practice, a certain maximum limit. If the limit is exceeded, two separate walls have to be used. Thus, the support arrangements for the common wall sections can in some cases prevent the utilization of large separators of optimum size.

The width of the planar outer wall of a rectangular separator is always at least as large as the vortex diameter, but the width of an individual wall in the separator according to the present invention can be distinctly smaller than the vortex diameter. Thus, one of the advantages of the separator according to the present invention is that the aforementioned problem related to supporting the common wall sections is encountered only with separators in which the gas spaces have diameters larger than the gas spaces in rectangular separators that encounter the problem.

On the basis of the above, the diameter of the vortex chamber in a particle separator according to the present invention can, in each individual case, be optimized more freely than the diameter of the vortex chamber in cooled cylindrical particle separators or separators with a rectangular outer wall can be optimized. Preferably, the diameter of the vortex chamber according to the present invention is about 3 to about 8 m, e.g., about 5 m.

Since the vortex chambers according to the present invention are not rectangular in cross section, free triangular spaces are established when the vortex chambers are connected to each other and to the reaction chamber. Preferably, e.g., vertical support structures of the entire reactor plant can be disposed in these spaces. These free spaces can preferably also be used for the disposing of various metering and inspection ports as well as sampling connections and feed ducts for various materials.

BRIEF DESCRIPTION OF THE DRAWINGS

The invention is illustrated further with reference to the accompanying drawings, in which.

DESCRIPTION OF THE PREFERRED EMBODIMENTS

Figure 1:
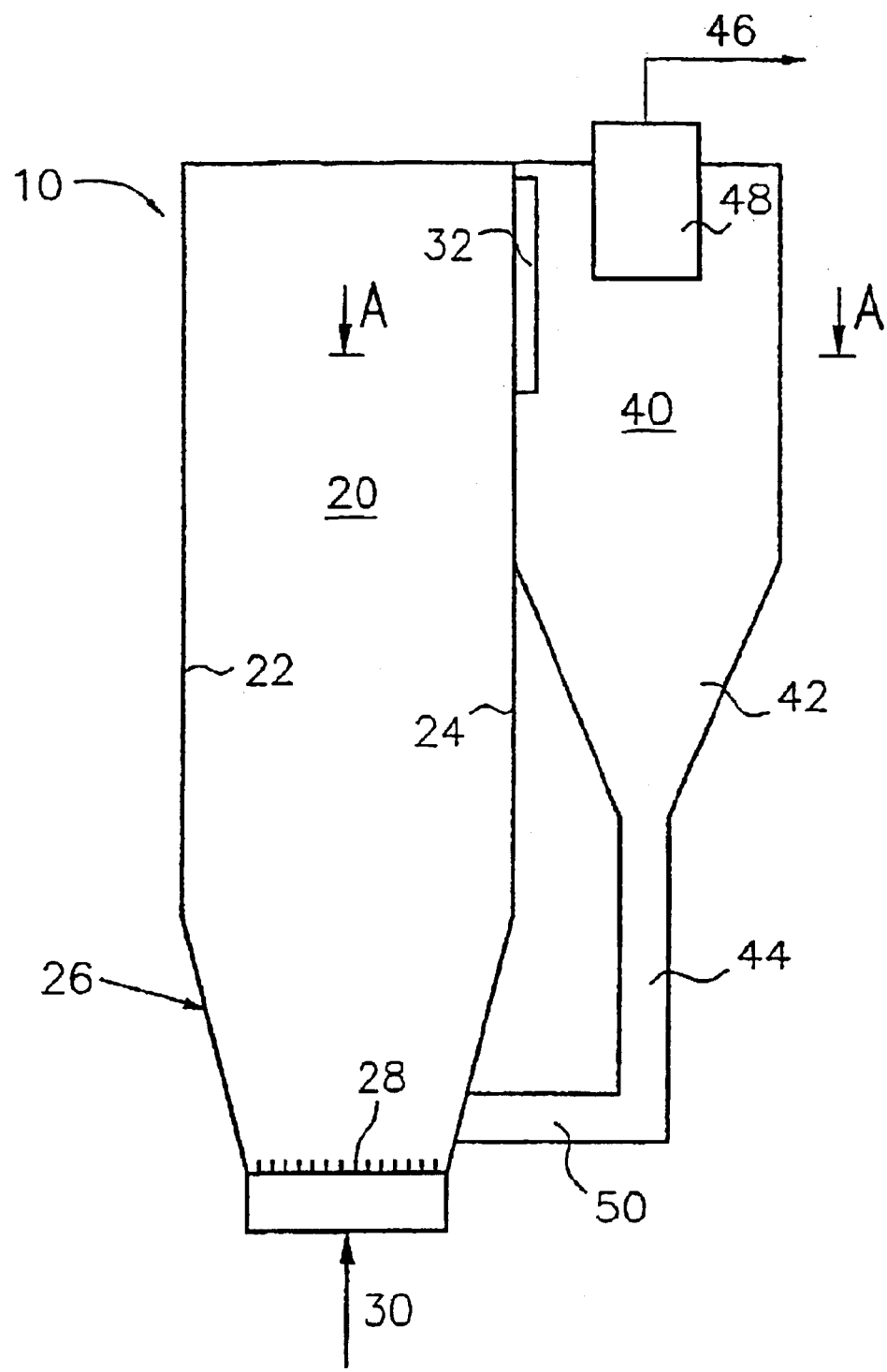
FIG. 1 is a vertical, schematic cross-sectional view of a fluidized bed reactor comprising a centrifugal separator according to the present invention.

FIG. 1 discloses a circulating fluidized bed reactor 10 comprising a reaction chamber 20, a centrifugal particle separator (cyclone) 40, and a return duct 44 for returning separated particles to the chamber 20. The reaction chamber 20, being rectangular in horizontal cross section, is laterally surrounded by water tube walls, only the walls 22 and 24 of which are shown in FIG. 1. The water tube walls are formed of vertical water tubes connected to each other, as is known per se, by narrow steel ribs welded between the tubes, i.e., by fins. The outer walls of the particle separator 40 are formed of similar planar water tube panels as the reaction chamber 20 walls.

Fuel and other substances needed in the reaction chamber, e.g., solid bed material, are introduced into the reaction chamber through various inlet ducts, only the inlet duct 26 of which is shown in FIG. 1. The bed material in the reaction chamber is fluidized by fluidizing gas 30 introduced through a grid 28 at the bottom thereof. Fluidizing gas, e.g., air, is introduced into the reaction chamber with such a velocity that bed material flows continuously entrained in the gas to the upper section of the reaction chamber 20 and further to the particle separator 40 through an inlet duct 32 disposed in the upper section.

The gas flowing from the reaction chamber 20 forms a vertical gas vortex in the particle separator 40, which includes a vortex chamber 70 (shown in FIG. 4), whereby the particles entrained in the gas are driven to the inner walls of the vortex chamber and fall through the tapered lower section 42 of the vortex chamber to the return duct 44 and further back to the reaction chamber 20. The gas 46 purified of particles exits the separator through a gas outlet duct disposed in a roof section of the vortex chamber, i.e., through a center pipe 48. The structure of the particle separator 40 according to the present invention, detailed in FIGS. 3 through 6, is particularly useful when the ratio between the center pipe 48 diameter and the smallest diameter of the particle separator 40 exceeds 0.4, and especially, when it is over 0.5. Downstream of the center pipe 48 are typically provided, though not shown in FIG. 1, a heat recovery unit, a precipitator, and a chimney. The lower section 42 of the particle separator 40 is preferably also formed of planar water tube panels. The lower section of the return duct 44 is provided with an L-bend 50 or another gas lock assembly preventing the gas from flowing from the reaction chamber 20 through the return duct 44 to the particle separator 40.

Figure 2:
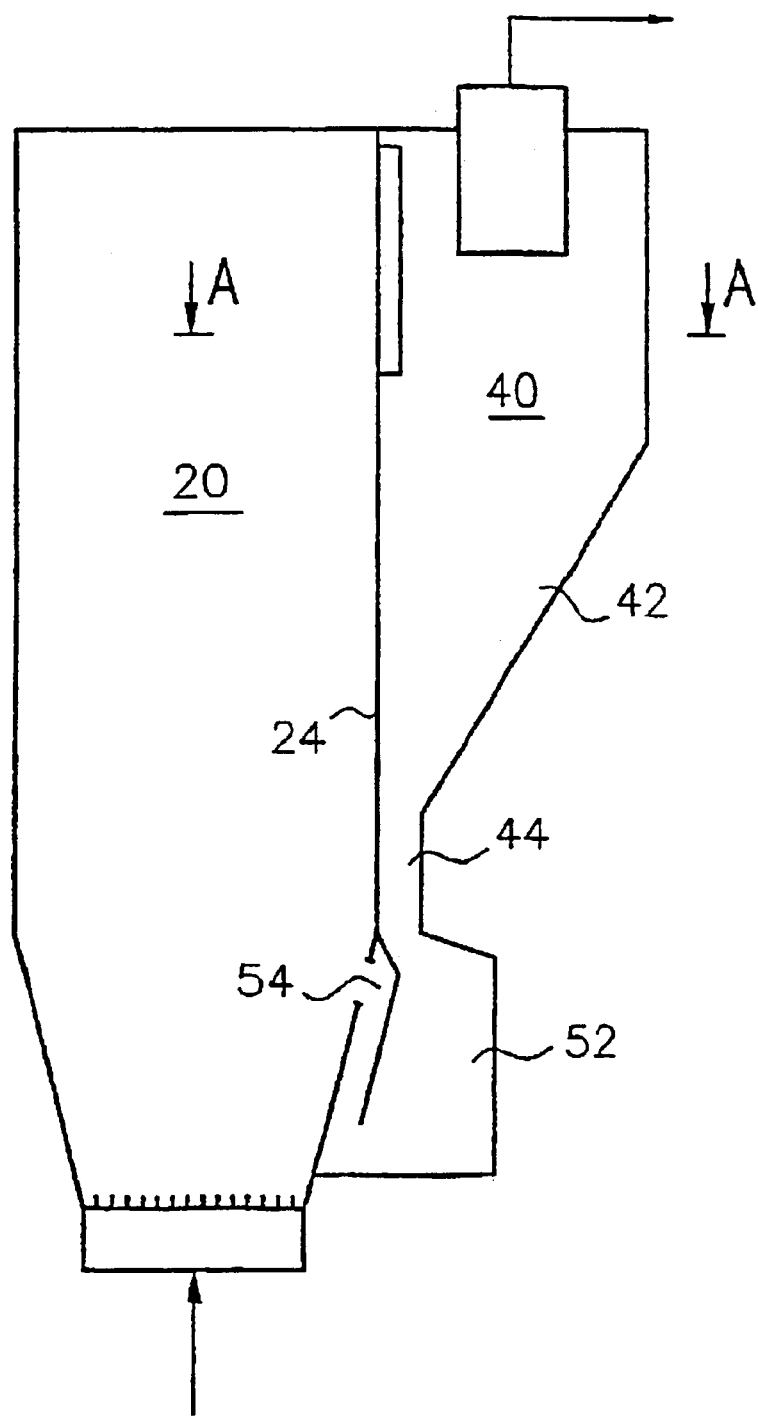
FIG. 2 is a schematic, vertical cross-sectional view of another fluidized bed reactor comprising a centrifugal separator according to the present invention.

FIG. 2 is otherwise similar to FIG. 1, but in FIG. 2, the tapered lower section 42 of the separator 40 is asymmetric. Thus, in FIG. 2, the common wall 24 shared by the separator 40 including the return duct 44 forming an extension thereof, and the reaction chamber 20, extends almost along the entire height of the reaction chamber. FIG. 2 depicts also a heat exchange chamber 52 connected to the lower section of the return duct 44, the bed material circulating from the particle separator 40 being returned to the reaction chamber 20 through an overflow opening 54 connected to the heat exchange chamber 52. In the assembly according to FIG. 2, the reaction chamber 20, the particle separator 40, and the return duct 44 form an integrated unit, which is advantageous as regards the supporting of the structure, space utilization, and the manufacturing costs. Especially, when an assembly according to FIG. 2 is used, the unit comprising the upper and lower section 42 of the separator 40, the return duct 44, and the heat exchange chamber 52 can preferably be manufactured cooled so that a significant part of the cooling pipes extends from the bottom of the heat exchange chamber 52 up to the roof of the separator 40.

Figure 3:
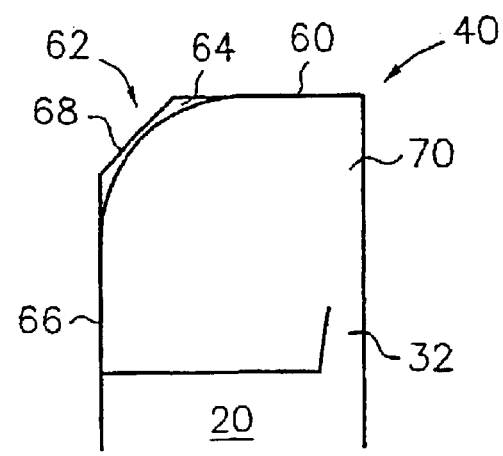
FIG. 3 is a cross-sectional view of the centrifugal separator of FIG. 1 or FIG. 2 taken along line A—A thereof.

Particle separator assemblies according to various embodiments of the present invention are shown in more detail in FIGS. 3 through 6. FIG. 3 is a schematic cross-sectional view of FIG. 1 or FIG. 2 taken along line A—A thereof. The gas flowing from the reaction chamber 20 through the inlet duct 32 hits first, nearly perpendicularly, the wall 60 facing the vortex chamber 70 (see FIG. 4), whereby a significant part of the particles entrained in the gas are retarded essentially and fall down to the lower section of the particle separator 40.

According to the present invention, the corner 62 diagonally facing the inlet duct 32 of the vortex chamber 70 in a nearly quadrate cross section is rounded by a refractory lining 64 so as to maintain the velocity of the gas vortex. The right angle between the perpendicular walls 60 and 66 is beveled by a planar wall section 68 so that two obtuse angles are established. Thus, the weight of the rounding material 64 remains small and its heat conductivity to the cooled outer walls 60, 66, and 68 is high. Compared to the arrangement disclosed in U.S. Pat. No. 4,615,715, a considerably smaller amount of refractory lining results in a more lightweight and durable construction, which is easier to support and cools more effectively.

Since a gently beveled and refractory lining rounded corner is more expensive to manufacture than a simple corner, only the corner diagonally facing the inlet duct 32 is rounded in the arrangement according to FIG. 3. Thus, a particle separator 40, which is particularly low in price and still effective, is provided. Naturally, any corners of the separator 40, if not all, can be beveled and lined with a refractory material. In the embodiment according to FIG. 3, the wall sections that are not rounded are provided with a thin, even refractory layer to protect the water tube walls of the separator 40, which is not, however, shown in the illustration.

In a large fluidized bed reactor, in which a plurality of particle separators are required, a necessary number of parallel particle separators according to FIG. 3 can be provided. Two parallel separators can be disposed such that their inlet ducts run either parallel with respect to the vortex chamber 70 or are disposed symmetrically with respect to the surface between the separators 40, in the corners closest to or farthest from each other. Especially, when the inlet ducts 32 of two adjacent separators 40 are arranged next to each other, the wall between the vortex chambers 70 can be partly or totally eliminated, whereby the arrangement approaches the combined vortex chamber arrangement of two vortices.

Figure 4:
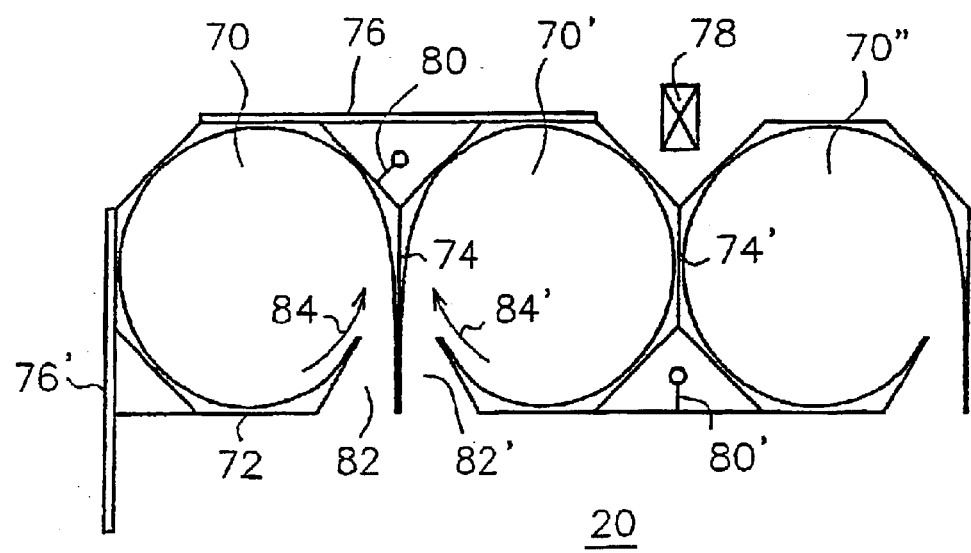
FIGS. 4 through 6 are cross-sectional views like that of FIG. 3 showing alternative embodiments of the centrifugal separator according to the present invention.

FIG. 4 illustrates a particle separator assembly arranged in a large reaction chamber 20 comprising a plurality of vortex chambers 70, 70', 70". Three parallel vortex chambers are shown in FIG. 4, but naturally, they can also be larger or smaller in number than three. The entire gas space of the vortex chambers according to FIG. 4 is rounded and each chamber corner is approximately 135 degrees. The lower portion 42 of the separator shown in FIG. 1 and FIG. 2 is preferably also manufactured of planar water tube panels, but it has been discovered that it is not necessary to extend the rounding according to the present invention as far as to the lower section 42.

The amount of refractory lining required for rounding the gas space of a vortex chamber octagonal in cross section is considerably smaller than the amount needed for rounding a quadrate vortex chamber according to U.S. Pat. No. 4,615,715. The heat conductivity of a thin refractory layer is high and the vortex chamber walls formed of planar water tube panels cool the separator efficiently. Thereby, such a vortex chamber is durable, can be manufactured at low cost, and its separation capacity is the highest possible.

Octagonal vortex chambers according to FIG. 4 can preferably be attached to each other and to the reaction chamber by connecting the parallel walls together or by providing common wall sections 72, 74, and 74', as shown in FIG. 4. The parallel walls of the vortex chambers, and the parallel walls shared by the vortex chambers and the reaction chamber, can preferably also be supported against each other by using support beams 76 and 76'.

Between the polygonal vortex chambers, as well as between the vortex chambers and the reaction chamber, remain free triangular spaces that can preferably be utilized, e.g., for disposing support structures 78 for the entire reactor plant, feed ducts or metering conduits 80, 80' for additives that reduce impurities in flue gases, or for other substances. Between the vortex chambers 70 and 70' according to FIG. 4 are also disposed inlet ducts 82, 82' that lead the gas jets entering the vortex chambers parallel to the tangents of the gas vortices 84 and 84' in the vortex chambers.

Figure 5:
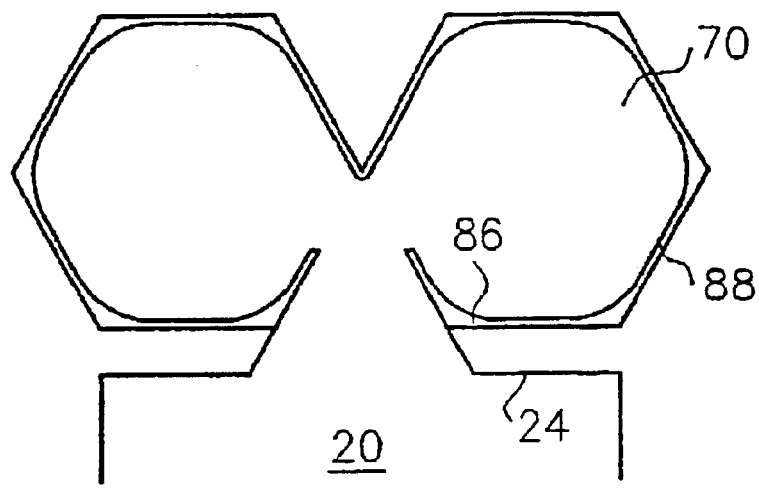

FIG. 5 shows a separator assembly formed of two hexagonal vortex chambers 70. In the arrangement according to FIG. 5, one of the outer walls 86 of the vortex chamber 70 is parallel to the reaction chamber 20 wall 24. In this arrangement, the separators 40 can preferably be connected to the reaction chamber 20 by using, e.g., intermediate supports. Another alternative is to arrange two hexagonal vortex chambers 70 by providing a common wall or parallel walls between them, whereby one of the angles of the vortex chamber 70 is directed toward the reaction chamber 20.

Each corner in the hexagonal vortex chambers 70 according to FIG. 5 has been rounded separately so that straight wall sections 88 covered with a thin, smooth lining are left between the rounded corners. Especially, when the number of vortex chamber angles is less than eight, a light and durable separator assembly can preferably be provided in this manner.

Figure 6:
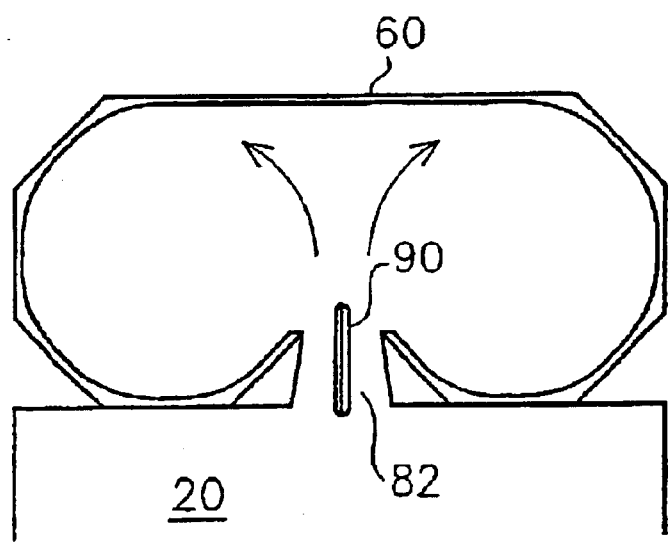

FIG. 6 illustrates a separator assembly of two vortices reminiscent of the arrangement of two adjacent vortex chambers 70 according to FIG. 4, but somewhat less expensive to construct. In this arrangement, the gas jet entering from the reaction chamber 20 through an inlet duct 82 divided by a partition wall 90 hits perpendicularly the opposite wall 60 and is divided into two vortices that whirl in opposite directions in the rounded ends of the vortex chamber 70.

In the aforementioned examples, the number of the vortex chamber angles was six or eight, but it can also be another, e.g., five or seven. While the number of angles increases, the amount of refractory lining required for the rounding decreases, but at the same time the number of water tube panels and the manufacturing costs increase. Thus, there exists an optimum number of angles, normally between five and ten.

Another factor affecting the advantageousness of the shape of the vortex chamber 70 is the number of parallel walls in the construction, being larger with an even number than with an odd number of angles, and especially large when the number of angles is divisible by four. Thus, a particularly preferable number of vortex chamber angles is eight, but as mentioned above, in some cases, the most advantageous arrangement can be obtained by having some other number of angles.

While the invention has been herein described by way of example in connection with what are currently considered to be the most preferred embodiments, it will be apparent to those of ordinary skill in the art that many modifications and combinations may be made of the disclosed embodiments. Thus, the invention covers several other applications included within the scope of the invention as defined in the appended claims.

What is claimed is:

1. A centrifugal separator assembly attached to a fluidized bed reactor for separating solid particles from gas exhausted from a reaction chamber of the fluidized bed reactor, the separator assembly comprising:

a vortex chamber which is in a horizontal direction defined by vertically-extending outer walls formed of planar water tube panels, the inside of the outer walls being at least partly provided with a refractory lining and defining a gas space in the vortex chamber, where at least one vertical gas vortex is established;

at least one inlet for introducing gas into the gas space from the reaction chamber;

at least one outlet for discharging purified gas from the gas space; and at least one outlet for discharging separated solid particles from the gas space, wherein the vertically-extending outer walls of the vortex chamber form at least one corner, the angle between the sides of which exceeding ninety degrees, and the corner being rounded by a refractory lining on the inside of the outer walls.

2. A centrifugal separator assembly according to claim 1, wherein the vertically-extending outer walls of the vortex chamber form at least one corner, the angle between the sides of which being about 110 to about 150 degrees, and the corner being rounded by a refractory lining on the inside of the outer walls.

3. A centrifugal separator assembly according to claim 1, wherein one of the vertically-extending outer walls faces the gas inlet and is located approximately perpendicularly to gas inflow, and an adjacent corner after a first impact in a side gas flow direction is rounded by the refractory lining on the inside of the outer walls, and the angle between the outer walls forming the adjacent corner exceeds ninety degrees.

4. A centrifugal separator assembly according to claim 1, wherein the vertically-extending outer walls of the vortex chamber form at least two corners, the angle between the sides of which exceeding ninety degrees, and the corners being rounded by the refractory lining on the inside of the outer walls.

5. A centrifugal separator assembly according to claim 1, wherein the outer walls of the vortex chamber form two corners, one of which is rounded by the refractory lining on the inside of the outer walls so that a radius of curvature of the rounding is $r_1$, and the other of which is not rounded on the inside or is rounded in such a manner as to have a radius of curvature $r_2$ different from $r_1$.

6. A centrifugal separator assembly according to claim 4, wherein every angle between adjacent walls of the vertically-extending outer walls of the vortex chamber exceeds ninety degrees, and each corner formed by the adjacent walls of the vertically-extending outer walls is rounded by the refractory lining on the inside of the outer walls.

7. A centrifugal separator assembly according to claim 6, wherein the vertically-extending outer walls of the vortex chamber form an approximately regular polygon.

8. A centrifugal separator assembly according to claim 7, wherein the angles formed by the outer walls are about 108 to about 135 degrees.

9. A centrifugal separator assembly according to claim 7, wherein the angles formed by the outer walls are about 135 degrees.

10. A centrifugal separator assembly according to claim 1, wherein the separator assembly comprises two separators sharing a common wall.

11. A centrifugal separator assembly according to claim 1, wherein the separator assembly and the reactor share a common wall section.

12. A centrifugal separator assembly according to claim 1, wherein the separator assembly comprises two separators, and a triangular free space is left between the separators, in which space a reactor support structure or a feed duct or a metering conduit is provided.

13. A centrifugal separator assembly according to claim 1, wherein a triangular free space is left between the separator assembly and the reactor, in which space an inlet duct for gas exhausted from the reaction chamber or a feed duct or a metering conduit is provided.

14. A centrifugal separator assembly according to claim 1, wherein the bottom of the separator assembly is asymmetric and forms a unit integrated with the reaction chamber and the at least one outlet for discharging separated solid particles from the gas space.

15. A method of separating solid particles from gas exhausted from a reaction chamber of a fluidized bed reactor in a centrifugal separator assembly, the method comprising providing a separator assembly that comprises:

a vortex chamber which is in a horizontal direction defined by vertically-extending outer walls formed of planar water tube panels, the inside of the outer walls being at least partly provided with a refractory lining and defining a gas space in the vortex chamber, where at least one vertical gas vortex is established;

at least one inlet for introducing gas into the gas space from the reaction chamber;

at least one outlet for discharging purified gas from the gas space; and at least one outlet for discharging separated solid particles from the gas space, wherein exhausted gas in the vortex chamber is brought to hit at least one corner rounded by the refractory lining on the inside of the outer walls, and the angle between the vertically-extending outer walls of which corner exceeds ninety degrees.

\* \* \* \* \*